United States Patent [19]

Panther

[11] 3,800,299

[45] Mar. 26, 1974

[54] MEMORY CELL ARRAY WITH MULTIPLEXED COLUMN SELECT LINES

[75] Inventor: Gyles Panther, Ottawa, Ontario, Canada

[73] Assignee: Microsystems International Limited, Quebec, Canada

[22] Filed: Feb. 6, 1973

[21] Appl. No.: 329,994

[30] Foreign Application Priority Data

Dec. 22, 1972 Canada .......................... 159853

[52] U.S. Cl. .......................... 340/173 FF, 307/241

[51] Int. Cl. .......................... G11c 7/00, G11c 11/40

[58] Field of Search .................. 340/173 FF, 173 R; 307/241, 238

[56] References Cited

UNITED STATES PATENTS

| | | | |
|---|---|---|---|
| 3,328,769 | 6/1967 | Lee | 340/173 FF |
| 3,541,531 | 11/1970 | Iwersen et al. | 340/173 FF |
| 3,641,511 | 2/1972 | Cricchi et al. | 340/173 FF |
| 3,651,491 | 3/1972 | Kobayashi | 340/173 FF |

*Primary Examiner*—Bernard Konick
*Assistant Examiner*—Stuart N. Hecker
*Attorney, Agent, or Firm*—E. E. Pascal

[57] ABSTRACT

The invention relates to memory-cell arrays wherein the COLUMN SELECT lines are multiplexed so that for, say, the *n*th cell, the COLUMN SELECT lines associated with the (*n*—1) and (*n*+1) cells function as the BIT and $\overline{\text{BIT}}$ lines for the *n*th cell. Means for reading and writing into the cells of this array are also disclosed.

6 Claims, 6 Drawing Figures

MEMORY CELL ARRAY WITH MULTIPLEXED COLUMN SELECT LINES

The present invention relates to memory-cell arrays.

A memory-cell array conventionally comprises a network of parallel BIT, COLUMN SELECT and $\overline{BIT}$ rails extending in one direction and parallel power supply and — where more than one row of cells is used — ROW SELECT rails extending at 90° to the BIT and $\overline{BIT}$ rails. Memory cells are connected between the rails in an array. To determine the state of a cell, the cell is powered by applying potential thereto through the COLUMN SELECT rail associated with that cell — by the term "applying potential thereto," it is meant that the impedance to ground of the COLUMN SELECT rail is modified so that current preferentially flows from the power supply rail into the BIT or $\overline{BIT}$ rail, or the COLUMN SELECT rail itself may become the power supply for the cell — and the associated BIT and $\overline{BIT}$ rails are sensed to determine which side of the cell has a "ONE" information stored therein and vice-versa. It is understood that throughout this application, a "ONE" logic level indicates an enabling potential level for devices in the circuit and a "ZERO" a disabling potential.

A conventional array of this type has a number of disadvantages — particularly when fabricated in integrated circuit form. A large numer of connections are needed as well as underpasses and cross-overs upon the chip because of the large number of rails involved. The purpose of the present invention is to eliminate some of these rails — specifically the BIT and $\overline{BIT}$ rails — by multiplexing the COLUMN SELECT rail functions. In this manner, the number of underpasses and connections required are reduced considerably.

Thus, according to the present invention, I provide a binary logic memory array having a plurality of memory cells, each of said cells having first, second and third COLUMN SELECT lines associated therewith, said first and third lines connected to first and second complementary level output terminals of each said cell and said second line connected to each said cell for applying a potential to that cell such that an output is derived from one or other of said complementary output terminals thereof indicative of the logic state of said cell; the improvement comprising means for connection to a potential supply means for selectively applying a potential to the *n*th cell in said array through the COLUMN ($n$) SELECT line associated therewith — the integer ($n$) referencing any given cell and its associated COLUMN SELECT line with respect to which the remaining said cells and COLUMN SELECT lines are referenced — such that an output potential indicative of the logic state of said cell appears as aforesaid on the adjacent COLUMN ($n-1$) SELECT line or COLUMN ($n+1$) SELECT line and means for reading the logic state of said cell by sensing the relative potential levels of said COLUMN ($n-1$) SELECT line and said COLUMN ($n+1$) SELECT line and for writing information into said cell by modifying the potential levels of said COLUMN ($n-1$) SELECT line and said COLUMN ($n+1$) SELECT line in order to change the logic state of said cell.

The invention will now be described further by way of example only and with reference to the accompanying drawings in which.

Figure 1:
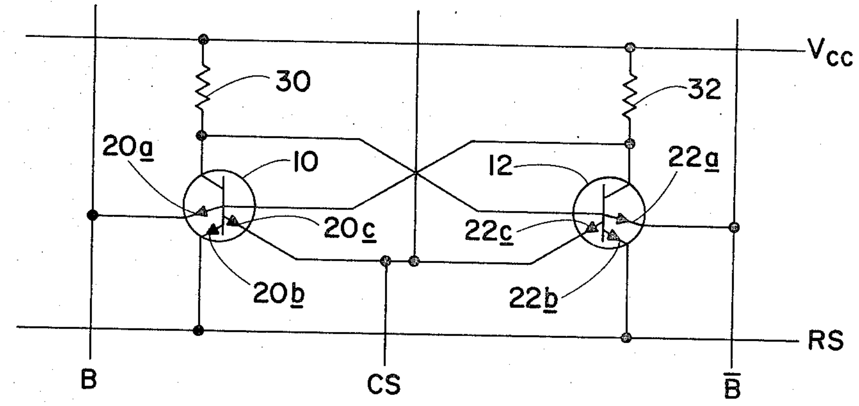
Fig. 1 (PRIOR ART)
FIG. 1 shows in block form a cell connected into a memory array in the manner of the prior art.

The memory array is comprised of cells having binary complementary outputs. Many different kinds of cell configurations have such output properties, the great majority of which are based on the well-known flip-flop. FIG. 1 of the drawings shows one type of cell which is widely in use in conventional memory cell arrays, and such cell is readily adaptable for use in the array of the present invention. Referring to FIG. 1, there is shown a typical memory cell comprising transistors 10 and 12, each having three emitter electrodes 20*a*, 20*b* and 20*c* and 22*a*, 22*b* and 22*c*, respectively. The bases of transistors 10 and 12 are cross-coupled with their opposite collector electrodes and the collector electrodes are connected to a $V_{cc}$ supply rail through resistors 30 and 32. Emitters 20*a* and 22*a* are connected to BIT and $\overline{BIT}$ rails B and $\overline{B}$, respectively, emitters 20*b* and 22*b* are connected to a ROW SELECT rail RS and emitters 20*c* and 22*c* are connected to a COLUMN SELECT rail CS. Since transistors 10 and 12 constitute, in combination, a flip-flop, when one transistor is enabled, the other is disabled. In the quiescent state of the cell, current is drawn from the $V_{cc}$ rail, through whichever transistor is enabled, into the COLUMN SELECT rail. To determine the state of the memory cell and obtain a readout therefrom, the impedances to ground of the ROW SELECT and COLUMN SELECT rails are raised so that an output will be derived at emitter 20*a*, feeding the BIT line, if transistor 10 is enabled or at emitter 22*a*, feeding the $\overline{BIT}$ line, if transistor 12 is enabled.

Connecting the cell of FIG. 1 into a conventional memory-cell array has a serious disadvantage, particularly when the array is fabricated in integrated-circuit form and that is that an undesirably large number of connections is required. Since the $V_{cc}$ rail is shared by mirror-image rows of cells and the BIT and $\overline{BIT}$ rails by adjacent columns, these may be said to constitute three half-connections. Connections are also required for the ROW SELECT and COLUMN SELECT rails. Now, it may be seen that the $V_{cc}$ and ROW SELECT rails cross paths with the BIT and $\overline{BIT}$ rails and with single-layer integrated circuit technology, both the former rails require diffused underpasses beneath the BIT and $\overline{BIT}$ rails. This problem could be diminished to some extent by making the $V_{cc}$ rail parallel to the BIT and $\overline{BIT}$ rails. Now, only the ROW SELECT rail would cross paths with the BIT and $\overline{BIT}$ rails. However, the $V_{cc}$ rail can no longer be shared in this configuration and the total number of connections on the chip is therefore increased. Thus, one improvement must be traded-off against a deterioration in chip real-estate utilization.

In the present invention, the BIT and $\overline{BIT}$ lines are replaced by the COLUMN SELECT lines of the adjacent cells. If the cell of FIG. 1 is now considered to be the *n*th cell in a row of a memory array, the emitters 20*c* and 22*c* are connected to the COLUMN ($n$) SELECT rail, the emitters 20*b* and 22*b* are connected to the ROW SELECT rail and now, instead of being connected to the BIT and $\overline{BIT}$ rails, the emitters 20c and 22c are connected to the COLUMN ($n$−1) SELECT and COLUMN ($n$+1) SELECT rails, respectively.

To read the cell, a read/write network attached to the memory-cell array connects the COLUMN ($n$−1) SELECT and COLUMN ($n$+1) SELECT rails to reference ground potential through a relatively low impedance. Now, current from whichever side of the cell is at level ZERO is drained through either the COLUMN ($n$+1) SELECT or COLUMN ($n$−1) SELECT rails and by sensing which rail carries such current, the state of the cell may be read. To write into the cell and change its state, the side having the ONE level is connected through the appropriate COLUMN ($n$−1) SELECT or COLUMN ($n$+1) SELECT rail and a low impedance means to reference ground potential. Now, this side of the cell goes to ZERO level and, since the cell is complementary, the other side goes to ONE.

As stated above, the cell of FIG. 1 is typical of the type of cell which may be used in the array of the present invention. An improvement upon the cell of FIG. 1 would be means to take advantage of the relatively high potential to which the ($n$) rail may be raised for reading of the cell by drawing current from the ($n$) rail during the READ operation and using a relatively low current draw from the $V_{cc}$ rail during the quiescent state of the cell. Such means may conveniently take the form of a series diode/resistor connection between each of the collectors of transistors 10 and 12 and the ($n$) rail. The diodes prevent pull-down of the transistor bases when the ($n$) rail goes to ZERO.

Figure 2:
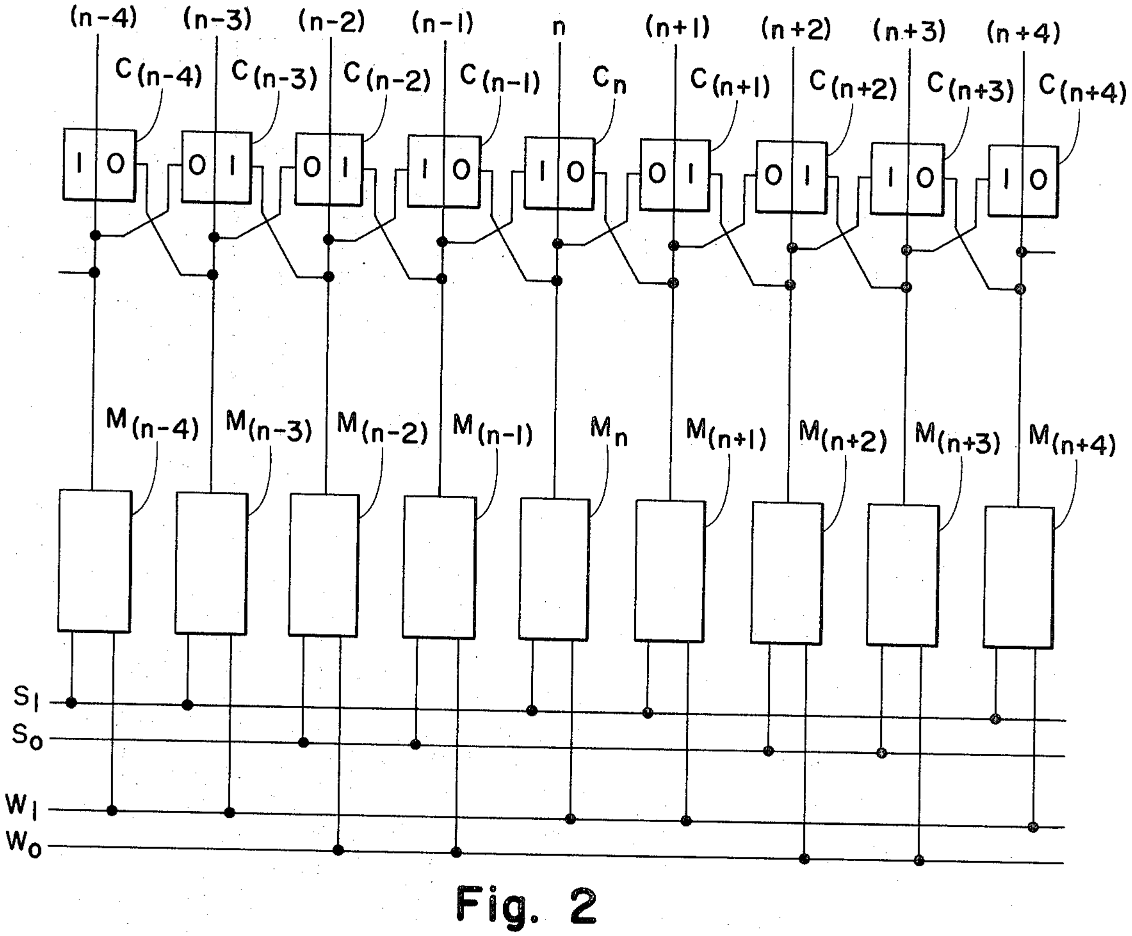
FIG. 2 shows part of a memory-cell array according to the present invention.

FIG. 2 shows part of a memory array according to the present invention having a row of memory cell designated from $C_{(n-4)}$ to $C_{(n+4)}$ inclusive and COLUMN SELECT rails designated ($n$−4) to ($n$+4) inclusive associated therewith. For clarity, the ROW SELECT and VR rails of FIG. 1 are omitted. Each COLUMN SELECT rail terminates in a sense/drive module $M_{(n-4)}$, $M_{(n-3)}$ . . . $M_{(n+4)}$, respectively, the modules comprising, in combination, a complete read/write circuit for the array. Associated with the module $M_{(n-4)}$ is a connection to a SENSE rail $S_1$ and a connection to a WRITE rail $W_1$. Associated with the module $M_{(n-3)}$ is a connection to the line $S_1$ and to the line $W_1$. Associated with the module $M_{(n-2)}$ is a connection to a SENSE rail $S_0$ and a WRITE rail $W_0$. Associated with the module $M_{(n-1)}$ is a connection to line $S_0$ and line $W_0$. Thus, it will be seen that the SENSE line and WRITE rail connections go in pairs, i.e., one pair of modules feeds the $S_1$ and $W_1$ lines, the next pair feeds the $S_0$ and $W_0$ lines, the next pair feeds the $S_1$ and $W_1$ lines, and so on. Suppose the cells have information stored therein as shown in FIG. 2. As explained in connection with FIG. 1, current is drawn from whichever side of the cell is at ZERO, through the COLUMN SELECT line associated therewith. So, if C ($n$−4) is read by raising the ($n$) rail, current is drawn down the ($n$−3) rail. Each module is such that current will flow in the SENSE rail to which that module is connected if a current flows in the associated COLUMN SELECT rail. Therefore, when current flows down the ($n$−3) rail, current will also flow in the $S_1$ rail. When $C_{(n-3)}$ is read, current flows in the ($n$−4) rail and, therefore, again in the $S_1$ rail.

It may be seen that, going through the cells in sequence, current always flows in the $S_1$ rail and thus, for a logic ONE output throughout the array the states of the cells are as shown in FIG. 2, i.e., 1, 0; 0, 1; 0, 1; 1, 0; 1, 0 etc. To write into a cell, say $C_n$, we raise the impedance to ground of the $W_1$ and ($n$) rails and we lower the impedance to ground of the WRITE ZERO rail $W_0$. The modules $M_{(n-1)}$ and $M_{(n+1)}$ function as will hereinafter be described to effectively clamp the ($n$−1) and ($n$+1) rails to the $W_0$ and $W_1$ rails, respectively. Now the complementary outputs of the cell $C_n$ change to 0, 1. If the array is now read through again, each cell will show a ONE output as current flows in the $S_1$ rail, except for cell $C_n$. When this cell is read, the side now having the ZERO level is that associated with the ($n$−1) rail. Thus, when this cell is read, current flows in the $S_0$ rail, indicating the ZERO condition of this cell.

Figure 3:
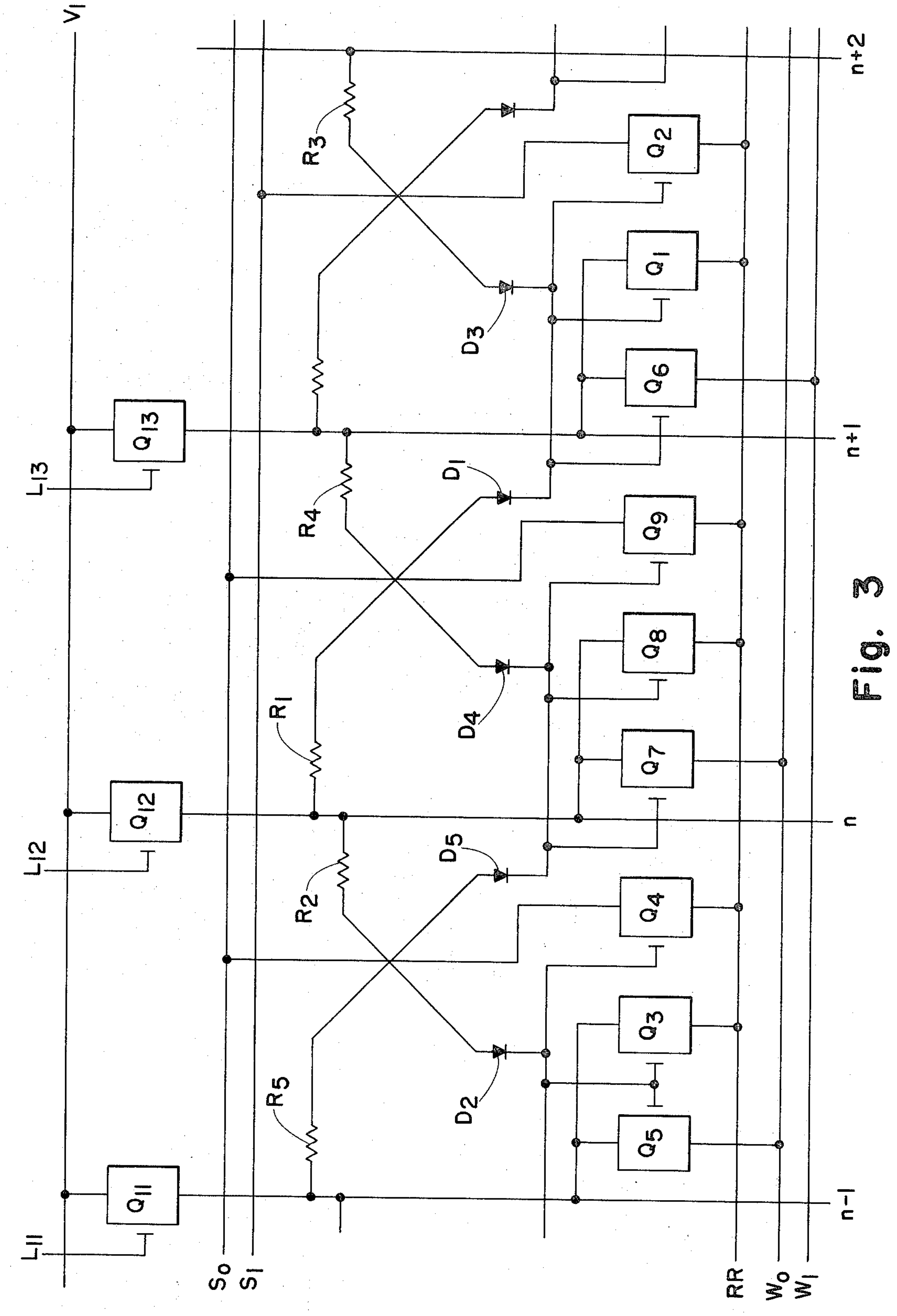
FIG. 3 shows part of a read/write circuit for use in the memory-cell array of the present invention.

FIG. 3 shows a circuit for reading and writing into a cell as described in FIG. 1. The COLUMN ($n$−1) SELECT, COLUMN ($n$) SELECT and COLUMN ($n$+1) SELECT rails are again shown and are again designated ($n$−1), ($n$) and ($n$+1), respectively. To the left of the COLUMN ($n$−1) SELECT rail in the drawing are the rails ($n$−2), ($n$−3) etc. (not shown) and to the right of the COLUMN ($n$+1) SELECT rail in the drawing are the rails ($n$+2), ($n$+3) etc. (not shown). Running at 90° to the COLUMN SELECT rails are a voltage supply rail $V_1$; SENSE "0" and SENSE "1" rails $S_0$ and $S_1$, respectively; a READ rail RR; and WRITE "0" and WRITE "1" rails $W_0$ and $W_1$, respectively. Each of the SENSE "0" and SENSE "1" rails has means associated therewith (not shown in FIG. 3) for sensing the current flow therein and each of the READ, WRITE "0" and WRITE "1" rails has means (not shown in FIG. 3) for selectively connecting the rail through either a low or high impedance to reference ground potential. Each of the COLUMN ($n$−1) SELECT, COLUMN ($n$) SELECT and COLUMN ($n$−1) SELECT rails is selectively connected to the voltage supply rail $V_1$ through a transistor $Q_{11}$, $Q_{12}$ or $Q_{13}$, respectively. The transistors $Q_{11}$, $Q_{12}$ and $Q_{13}$ have their control electrodes connected through rails $L_{11}$, $L_{12}$ and $L_{13}$ to selection means (not shown) for selecting which COLUMN SELECT rail is to be powered.

Associated with the COLUMN ($n$+1) SELECT rail are transistors $Q_6$, $Q_1$ and $Q_2$. The control electrodes of these transistors are interconnected and connected through series connected diode $D_1$ and resistor $R_1$ to the COLUMN ($n$) SELECT rail. The control electrodes of $Q_6$, $Q_1$ and $Q_2$ are also connected through series connected diode $D_3$ and resistor $R_3$ to the COLUMN ($n$+2) SELECT rail. The COLUMN ($n$+1) SELECT rail is connected to the READ rail RR through transistor $Q_1$ and to the WRITE "1" rail $W_1$ through transistor $Q_6$. The SENSE "1" rail $S_1$ is connected to the READ rail RR through transistor $Q_2$.

Associated with the COLUMN ($n$) SELECT rail are transistors $Q_7$, $Q_8$ and $Q_9$. The control electrodes of these transistors are interconnected and connected through series connected diode $D_5$ and resistor $R_5$ to the COLUMN ($n$−1) SELECT rail. The control electrodes of $Q_7$, $Q_8$ and $Q_9$ are also connected through series connected diode $D_4$ and resistor $R_4$ to the COLUMN ($n$+1) SELECT rail. The COLUMN ($n$) SELECT rail is connected to the READ rail RR through transistor $Q_8$ and to the WRITE "0" rail $W_0$ through transistor $Q_7$. The SENSE "0" rail $S_0$ is connected to the READ rail RR through transistor $Q_9$.

Associated with the COLUMN ($n$−1) SELECT rail are transistors $Q_5$, $Q_3$ and $Q_4$. The control electrodes of these transistors are interconnected and connected through series connected diode $D_2$ and resistor $R_2$ to the COLUMN ($n$) SELECT rail. The control electrodes of $Q_5$, $Q_3$ and $Q_4$ are also connected through a similar series diode resistor path to the COLUMN ($n-2$) SELECT rail (not shown). The COLUMN ($n-1$) SELECT rail is connected to the READ rail RR through transistor $Q_3$ and to the WRITE "0" rail $W_0$ through transistor $Q_5$. The SENSE "0" rail $S_0$ is connected to the READ rail RR through transistor $Q_4$.

The circuit operates as follows. To read, say, the cell associated with the COLUMN ($n$) SELECT rail, the power is applied to this rail from the $V_1$ rail by enabling transistor $Q_{12}$ via line $L_{12}$. Now, transistors, $Q_5$, $Q_3$ and $Q_4$ have enabling potential applied to their control electrodes through resistor $R_2$ and diode $D_2$. Similarly, enabling potential is applied to the control electrodes of transistors $Q_6$, $Q_1$ and $Q_2$ through resistor $R_1$ and diode $D_1$. When the cell is being read, the impedance of the READ rail RR to reference ground potential is low and the impedances of the WRITE rails $W_0$ and $W_1$ are high. Assuming, now, that the state of the cell being read is such that it is storing a ONE at its side associated with the COLUMN ($n-1$) SELECT rail and a ZERO at its side associated with the COLUMN ($n+1$) SELECT rail. Now, relatively high current will flow from the cell down the ($n+1$) rail whereas relatively little or no current will flow down the ($n-1$) rail. Transistor $Q_3$ and $Q_4$ are arranged to be a matched pair in terms of their current drawing properties, so that whatever current is drawn through $Q_3$, substantially the same current will be passed by $Q_4$. Thus, $Q_4$ may be said to "mirror" the current draw through $Q_3$ . Similarly, transistors $Q_1$ and $Q_2$ constitute a matched pair and $Q_2$ "mirrors" the current draw through $Q_1$. Since much higher current is drawn from the ($n+1$) line through $Q_1$ than is drawn from the ($n-1$) line through $Q_2$, the current draw through $Q_2$ will be correspondingly higher than that through $Q_4$. Thus the current drawn from the SENSE "1" line $S_1$ will be much higher than that drawn from the SENSE "0" line $S_0$ and this current draw may be sensed. Thus the condition of the cell is readily observable.

Figure 4:
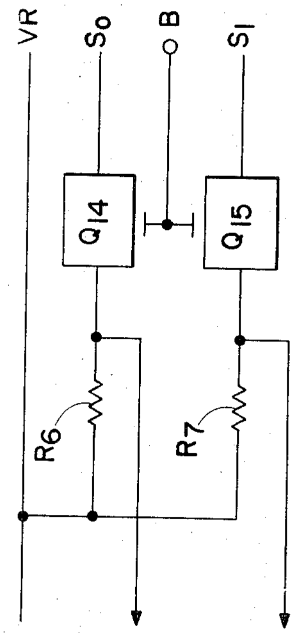

The means for sensing the current flow through each of lines $S_0$ and $S_1$ may be any current sensing means well known to those skilled in the art. For the present application, a convenient form of sensing means is shown in FIG. 4. The SENSE lines $S_0$ and $S_1$ are connected through transistors $Q_{14}$ and $Q_{15}$ and resistors $R_6$ and $R_7$, respectively, to the voltage supply rail VR. The control electrodes of $Q_{14}$ and $Q_{15}$ are interconnected and connected to a bias potential input terminal B. Thus, $Q_{14}$ and $Q_{15}$ are biased to the same potential and if outputs from the memory array are tapped from the junctions of the resistor $R_6$ and $Q_{14}$ and of the resistor $R_7$ and $Q_{15}$, these outputs will reflect the current drawn through these resistors from the voltage supply rail VR. Thus, the outputs of the array are directly dependent upon the respective current draws in the $S_0$ and $S_1$ lines which are in direct correspondence to the state of the cell being read.

Returning to FIG. 3, to write into the cell, the impedance of the READ rail RR to ground is raised and the impedance of the appropriate WRITE line is lowered. Thus, if it is desired to write a ONE into the side of the cell associated with the COLUMN ($n-1$) SELECT rail, the impedance of the $W_1$ rail is left high and that of the $W_0$ rail is lowered. Now, there is a high impedance to reference ground potential from the ($n+1$) rail since both the RR and $W_1$ rails are presenting high impedance, and, therefore the output node of the cell associated with the ($n+1$) rail goes to level ONE. SInce the outputs of the cell are complementary, and since there is a low impedance path to current flowing down the ($n-1$) rail and through transistor $Q_5$ and the $W_0$ line to reference ground potential, the output node of the cell associated with the ($n-1$) rail goes to level ZERO.

Figure 5:
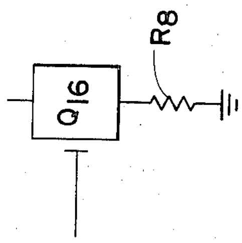
FIGS. 4 and 5 show peripheral circuitry for use with the circuit of FIG. 3.

The means for selectively changing the impedance of each of the READ and WRITE rails are conventional and, as shown in FIG. 5, typically comprises a low value resistor $R_8$ and a transistor $Q_{16}$ in series therewith between the rail and a reference ground potential point, so that when the transistor is disabled, a high impedance path exists and when it is enabled, a low impedance path exists, the transistor being controlled by appropriate selection means (not shown) connected to its control electrode. Various alternative means for achieving similar effect will, of course, be apparent to those skilled in the art.

Figure 6:
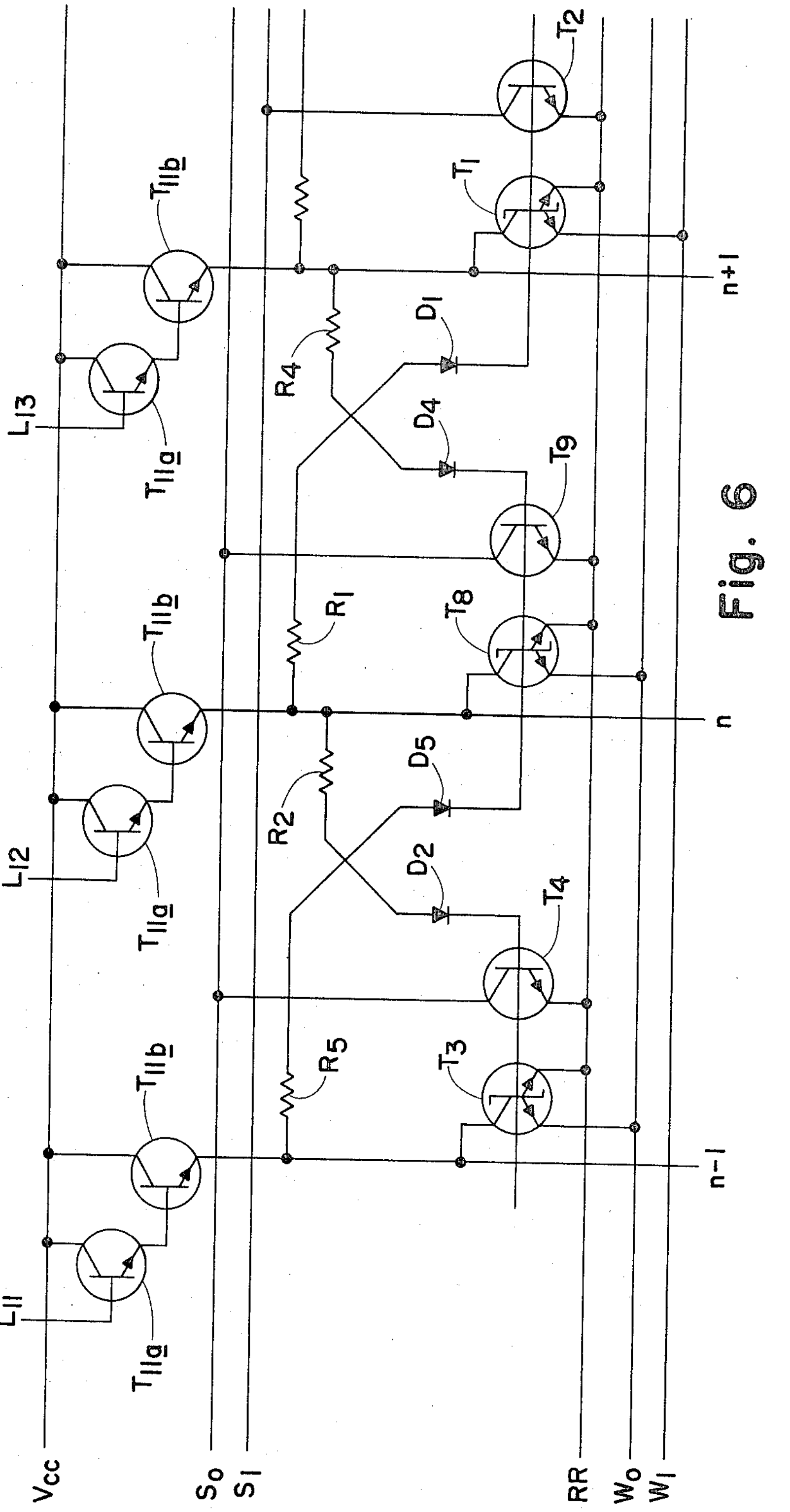
FIG. 6 shows a specific embodiment of the circuit of FIG. 3.

FIG. 6 shows one embodiment of the invention using bipolar transistors. The circuit comprises a series of parallel COLUMN SELECT rails designated ($n-1$), ($n$), ($n+1$) etc., as in FIG. 2. Each rail may be fed current from a $V_{cc}$ rail through Darlington pairs $T_{11a}$, $T_{11b}$, the base of each transistor $T_{11a}$ being selectively powered by peripheral circuitry (not shown) through a rail $L_{11}$, $L_{12}$ or $L_{13}$. Thus if the COLUMN ($n$) SELECT rail is to be powered, the transistor $T_{11a}$ associated with that rail is enabled through the rail $L_{12}$. Connected to each COLUMN SELECT rail is the collector of a transistor $T_3$, $T_8$ or $T_1$, respectively. Each such transistor has two emitters, the first of which is connected to a READ rail RR, the second emitter of each of $T_3$ and $T_8$ is connected to a WRITE "0" rail $W_0$ and the second emitter of $T_1$ is connected to a WRITE "1" rail $W_1$. Transistors $T_4$ and $T_9$ are connected between the READ rail RR and a SENSE "0" rail $S_0$ and a transistor $T_2$ is connected between the rail RR and a SENSE "1" rail $S_1$. The bases of $T_3$ and $T_4$ are interconnected and connected through diode $D_2$ and resistor $R_2$ to the COLUMN ($n$) SELECT rail and also through a series diode/resistor path to the COLUMN ($n-2$) SELECT rail (not shown). The bases of $T_8$ and $T_9$ are interconnected and connected through a diode $D_5$ and a resistor $R_5$ to the COLUMN ($n-1$) SELECT rail and also through a diode $D_4$ and a resistor $R_4$ to the COLUMN ($n+1$) SELECT rail. The bases of $T_1$ and $T_2$ are interconnected and connected through a diode $D_1$ and resistor $R_1$ to the COLUMN ($n$) SELECT rail and also through a similar series diode/resistor path to the COLUMN ($n+2$) SELECT rail (not shown).

The operation of the circuit is as follows. Suppose the side of the cell delivering current is that connected to the COLUMN ($n+1$) SELECT rail. This indicates a ZERO condition on that side of the cell. In order to keep the cell in this condition, a low impedance must be presented to the current flow down the COLUMN ($n+1$) SELECT rail. The low impedance is constituted by transistor $T_1$, which sinks the current to the READ rail RR. The transistor $T_1$ is enabled by potential derived from the COLUMN ($n$) SELECT rail through resistor $R_1$ and diode $D_1$. The transistor $T_2$ "mirrors" the current flow through $T_1$ and, since this current is relatively high, a high current flows in the SENSE "1" rail $S_1$. The base of transistor $T_3$ is connected to the COLUMN ($n$) SELECT rail through resistor $R_2$ and diode $D_2$ and is therefore enabled thereby. However, relatively low current flows down the COLUMN ($n-1$) SELECT rail and this is "mirrored" by transistor $T_{14}$. Thus very low current flows in the SENSE "0" rail $S_0$. Thus, by observing the current flows in the two SENSE rails, the state of the cell may be read as described above. As before, during the "READ" operation, the WRITE rails are connected through a high impedance to reference ground potential in order that substantially no current flows into such rails from $T_3$ and $T_1$.

To write into the cell, the impedance of the READ rail is raised so that no current flows into the rail from transistors $T_3$ and $T_1$. The side of the cell associated with the COLUMN ($n+1$) SELECT rail is presently at a ZERO level. To write a ONE into this side of the cell, the WRITE "1" rail remains at its previous high impedance level, the WRITE "0" rail now showing a low impedance. Now, a high impedance is presented to the ZERO output from the cell and this forces the state of the cell to reverse, as in the manner described above.

The transistors $T_1$, $T_3$ and $T_8$ are shown in FIG. 6 as clamping transistors. These are preferable from the viewpoint of speed — a technique well-known in Schottky TTL technology. However, the use of such transistors is by no means mandatory and, indeed, by appropriate circuit and potential level revisions, field-effect transistors may well be used throughout, instead of bipolar transistors. The use of the diode/resistor paths to provide enabling potentials to the transistors is for the purpose of potential level matching and is again a well-known technique.

Various alternatives and modifications to the embodiments disclosed herein will be readily apparent to those skilled in the art without departing from the spirit and scope of the invention as described by the disclosure and defined by the claims appended hereto.

What is claimed is:

1. A binary logic memory array having a plurality of memory cells, each of said cells having first, second and third COLUMN SELECT lines associated therewith, said first and third lines connected to first and second complementary level output terminals of each said cell and said second line connected to each said cell for applying a potential to that cell such that an output is derived from one or other of said complementary output terminals thereof indicative of the logic state of said cell; the improvement comprising means for connection to a potential supply means for selectively applying a potential to the $n$th cell in said array through the COLUMN ($n$) SELECT line associated therewith — the integer ($n$) referencing any given cell and its associated COLUMN SELECT line with respect to which the remaining said cells and COLUMN SELECT lines are referenced — such that an output potential indicative of the logic state of said cell appears as aforesaid on the adjacent COLUMN ($n-1$) SELECT line or COLUMN ($n+1$) SELECT line and means for reading the logic state of said cell by sensing the relative potential levels of said COLUMN ($n-1$) SELECT line and said COLUMN ($n+1$) SELECT line and for writing information into said cell by modifying the potential levels of said COLUMN ($n-1$) SELECT line and said COLUMN ($n+1$) SELECT line in order to change the logic state of said cell.

2. In a binary logic memory array having a plurality of memory cells, each of said cells having first, second and third COLUMN SELECT lines associated therewith, said first and third lines connected to first and second complementary level output terminals of each said cell and said second line connected to each said cell for applying a potential to that cell such that an output is derived from one or other of said complementary output terminals thereof indicative of the logic state of said cell; the improvement comprising means for connection to a potential supply means for selectively applying a potential to the $n$th cell in said array through the COLUMN ($n$) SELECT line associated therewith — the integer ($n$) referencing any given cell and its associated COLUMN SELECT line with respect to which the remaining said cells and COLUMN SELECT lines are referenced — such that an output potential indicative of the logic state of said cell appears as aforesaid on the adjacent COLUMN ($n-1$) or COLUMN ($n+1$) SELECT line, said COLUMN ($n+1$) SELECT line being connected through first transistor means to a READ line connected through a selected one of either a low or a high impedance means to means for connection to a reference ground potential, said first transistor means having a control electrode deriving enabling potential from said COLUMN ($n$) SELECT line, second transistor means connected between a first logic level SENSE line and said READ line, said second transistor means having a control electrode deriving enabling potential from said COLUMN ($n$) SELECT line and having current passing properties substantially the same as those of said first transistor means so that a given current draw through said first transistor means results in a similar current draw through said second transistor means, said COLUMN ($n-1$) SELECT line being connected to said READ line through third transistor means having a control electrode deriving enabling potential from said COLUMN ($n$) SELECT line, fourth transistor means connected between a second logic level SENSE line and said READ line, said fourth transistor means having a control electrode deriving enabling potential from said COLUMN ($n$) SELECT line and having current passing properties substantially the same as those of said third transistor means so that a given current draw through said third transistor means results in a similar current draw through said fourth transistor means, and means for sensing the respective current draws through said second and fourth transistor means from said first and second logic level SENSE lines.

3. The combination of claim 2 wherein each of said transistor means is a bipolar transistor.

4. The combination of claim 2 further comprising means for writing binary logic information into the cell, said means comprising fifth and sixth transistor means, deriving enabling potential from said COLUMN ($n$) SELECT line, said fifth transistor means connected between said COLUMN ($n-1$) SELECT line and a first logic level WRITE line connected through a selected one of either a low or high impedance means to means for connection to a reference ground potential and said sixth transistor means connected between said COLUMN ($n+1$) SELECT line and a second logic level WRITE line connected through a selected one of either a low or high impedance means to means for connection to a reference ground potential, and control means for selecting the high or low impedance state of said connection between each of said WRITE and READ lines and said means for connection to said reference ground potential, said control means selecting a high impedance state for said connection to said READ line when a low impedance state is selected for either of said connections to said WRITE lines, said control means selecting a high impedance state for both said connections to said WRITE lines when a low impedance state is selected for said connection to said READ line.

5. The combination of claim 4 wherein each of said transistor means is a bipolar transistor.

6. The combination of claim 4 wherein said first and sixth transistors means comprise, in combination, a first transistor having collector, base and first and second emitter electrodes, said collector electrode connected to said COLUMN (*n*—1) SELECT line, said base electrode connected through impedance matching means to said COLUMN (*n*) SELECT line, said first emitter electrode connected to said READ line and said second emitter electrode connected to said second logic level WRITE line, said second transistor means being a second bipolar transistor and the current passing properties of said first and second transistors being substantially the same; and said third and fifth transistor means comprise, in combination, a third transistor having collector, base and first and second emitter electrodes, said collector electrode connected to said COLUMN (*n*+1) SELECT line, said base electrode connected through impedance matching means to said COLUMN (*n*) SELECT line, said first emitter electrode connected to said READ line and said second emitter electrode connected to said first logic level WRITE line, said fourth transistor means being a fourth bipolar transistor and the current passing properties of said third and fourth transistors being substantially the same.

* * * * *